(12) United States Patent
Kolinko et al.

(10) Patent No.: US 7,415,244 B2
(45) Date of Patent: Aug. 19, 2008

(54) MULTI-CHANNEL MILLIMETER WAVE IMAGING SYSTEM

(75) Inventors: Vladimir Kolinko, San Diego, CA (US); John Lovberg, San Diego, CA (US)

(73) Assignee: Trey Enterprises Corp., San Diego, CA (US)

(*) Notice: Subject to any disclaimer, the term of this patent is extended or adjusted under 35 U.S.C. 154(b) by 603 days.

(21) Appl. No.: 11/180,105

(22) Filed: Jul. 12, 2005

(65) Prior Publication Data

US 2007/0001895 A1   Jan. 4, 2007

Related U.S. Application Data

(63) Continuation-in-part of application No. 10/728,432, filed on Dec. 8, 2003, now Pat. No. 7,194,236, and a continuation-in-part of application No. 10/639,332, filed on Aug. 12, 2003, now Pat. No. 6,883,864.

(60) Provisional application No. 60/587,619, filed on Jul. 13, 2004.

(51) Int. Cl.
   *H04B 7/14* (2006.01)
(52) U.S. Cl. .......................... 455/25; 455/9; 455/67.11; 455/101; 455/524; 342/22; 342/27; 342/52; 342/179; 343/754; 343/915
(58) Field of Classification Search ............ 455/9, 455/25, 67.11, 101, 524; 342/22, 27, 52, 342/179; 343/754, 915; 250/252.11, 336.1, 250/341.1
See application file for complete search history.

(56) References Cited

U.S. PATENT DOCUMENTS 5,227,800 A * 7/1993 Huguenin et al. ........... 342/179
6,057,761 A * 5/2000 Yukl ........................ 340/568.1
6,242,740 B1 * 6/2001 Luukanen et al. ............ 250/353
6,359,582 B1 * 3/2002 MacAleese et al. ........... 342/22
6,480,141 B1 * 11/2002 Toth et al. ..................... 342/22
6,501,414 B2 * 12/2002 Arndt et al. ................... 342/22
6,777,684 B1 * 8/2004 Volkov et al. ............. 250/341.1
6,791,487 B1 * 9/2004 Singh et al. ................... 342/22
6,856,271 B1 * 2/2005 Hausner ....................... 342/22
6,876,322 B2 * 4/2005 Keller .......................... 342/22
6,900,438 B2 * 5/2005 Vaidya et al. ............. 250/336.1
6,965,340 B1 * 11/2005 Baharav et al. ............... 342/22
2004/0080448 A1 * 4/2004 Lovberg et al. ............... 342/22
2004/0140924 A1 * 7/2004 Keller et al. .................. 342/22

* cited by examiner

*Primary Examiner*—Stephen M D'Agosta
(74) *Attorney, Agent, or Firm*—John R. Ross

(57) ABSTRACT

A broad-band millimeter wave imaging system with improved thermal resolution as compared to prior art devices. The system is useful for producing images of metal and non-metal objects such as guns, knives and explosives hidden under clothing. A cylindrical antenna focuses millimeter wave radiation from a substantially one dimensional section of a target region onto a linear array of radiation collectors. Radiation collected at each collector is amplified to produce a set of amplified millimeter wave signals and the amplified signals pass through focusing delay lines to a millimeter wave lens. Millimeter wave signals are collected at the output of the lens and the collected signals are monitored by an array of detectors. The combined effects of the delay lines and the lens produce a focus of the amplified millimeter wave radiation emitted and reflected from the one dimensional section of the target region. The array of millimeter wave detectors at the focus of the lens produces a one dimensional image of the one dimensional section of the target region. The antenna is scanned to produce a two dimensional image of the complete target region. The two dimensional image is displayed on a monitor screen. A full two-dimensional image of a human subject located at a stand-off distance of several meters (e.g., 7 meters) from the imager is acquired in few seconds time frame.

1 Claim, 8 Drawing Sheets

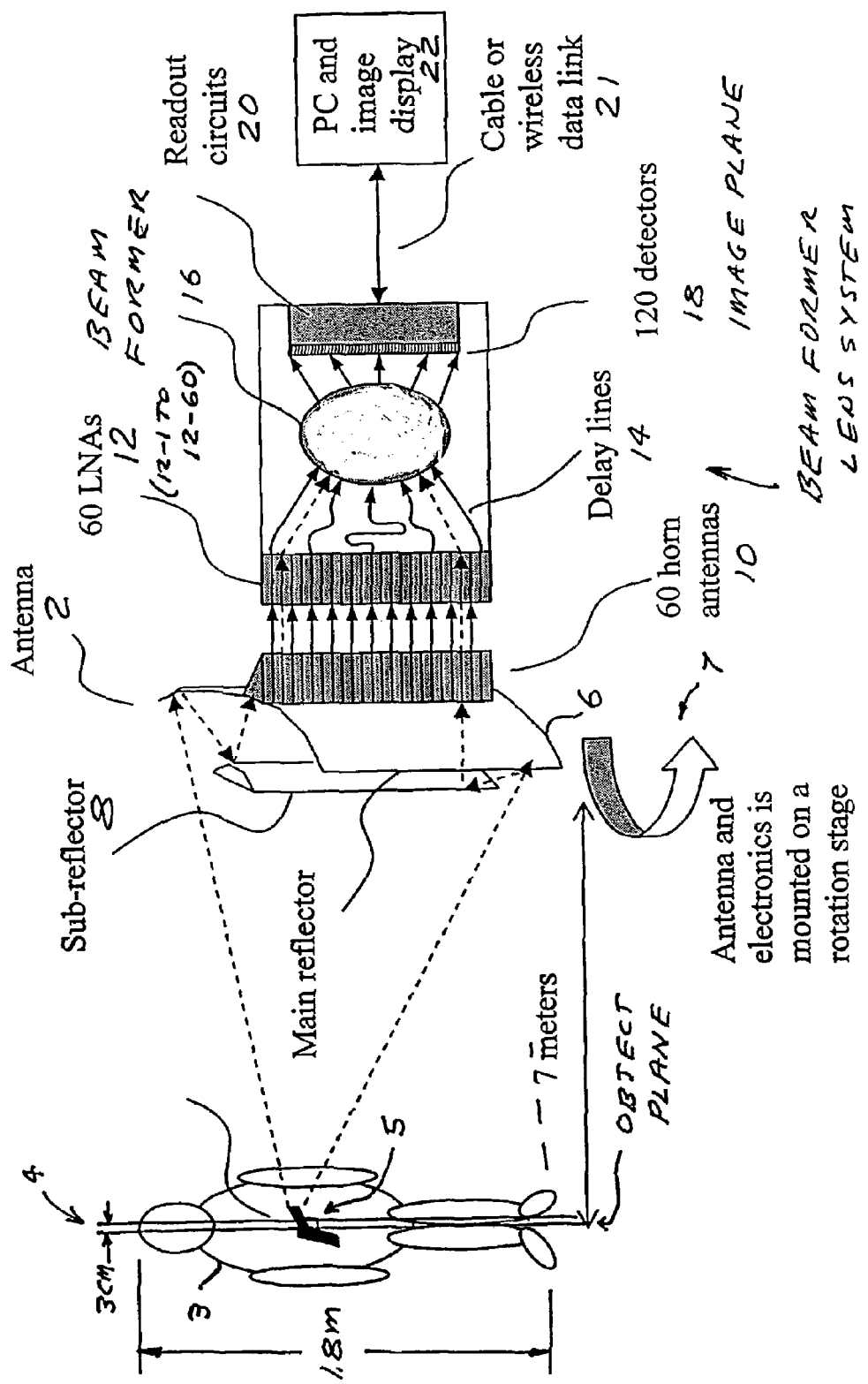

MULTI-CHANNEL MILLIMETER WAVE IMAGING SYSTEM

The present invention is a continuation in part of U.S. patent application Ser. Nos. 10/639,332 filed Aug. 12, 2003 now U.S. Pat. No. 6,883,864 and 10/728,432 filed Dec. 8, 2003 now U.S. Pat. No. 7,194,236, which are incorporated by reference herein and also claims the benefit of provisional application Ser. No. 60/587,619, filed Jul. 13, 2004. The present invention relates to imaging systems and in particular to millimeter wave imaging systems.

BACKGROUND OF THE INVENTION

Imaging systems operating at millimeter wavelengths (1 cm to 1 mm; 30 GHz to 300 GHz) are well known. These systems can be important because light at these wavelengths is not completely attenuated by substantial distances of fog or smoke, as is visible light. Light at millimeter wavelengths will also penetrate clothing and significant thickness of materials such as dry wood and wallboard. These millimeter wave imaging systems have therefore been proposed for aircraft to improve visibility through fog and for security applications for detection of hidden weapons and the like. Such systems are described in U.S. Pat. Nos. 5,121,124 and 5,365,237 that are assigned to Applicant's employer. The systems described in those patents utilize antennas in which the direction of collected millimeter wave radiation is a function of frequency. This type of antenna is referred to as a "frequency scanned" antenna. The collected millimeter wave light is analyzed in a spectrum analyzer to produce a one-dimensional image. In the systems described in the '124 patent the antenna signal is used to modulate an acousto-optic device (a Bragg cell) that in turn modulates a laser beam to produce a spectral image. In the systems described in the '237 patent an electro-optic module is modulated by the antenna signal and the electro-optic module in turn modulates the laser beam to impose the millimeter wave spectral information on a laser beam that then is separated into spectral components by an etalon to produce an image.

A need exists for a relatively low-cost millimeter wave imaging system with improved thermal resolution.

SUMMARY OF THE INVENTION

The present invention provides a broad-band millimeter wave imaging system with improved thermal resolution as compared to prior art devices. The system is useful for producing images of metal and non-metal objects such as guns, knives and explosives hidden under clothing. A cylindrical antenna focuses millimeter wave radiation from a substantially one dimensional section of a target region onto a linear array of radiation collectors. Radiation collected at each collector is amplified to produce a set of amplified millimeter wave signals and the amplified signals pass through focusing delay lines to a millimeter wave lens. Millimeter wave signals are collected at the output of the lens and the collected signals are monitored by an array of detectors. The combined effects of the delay lines and the lens produce a focus of the amplified millimeter wave radiation emitted and reflected from the one dimensional section of the target region. The array of millimeter wave detectors at the focus of the lens produces a one dimensional image of the one dimensional section of the target region. The antenna is scanned to produce a two dimensional image of the complete target region. The two dimensional image is displayed on a monitor screen. A full two-dimensional image of a human subject located at a stand-off distance of several meters (e.g., 7 meters) from the imager is acquired in few seconds time frame.

In a preferred embodiment a cylindrical Cassegrain antenna horizontally focuses millimeter wave radiation from a substantially one dimensional section (about 3 mm wide and 1.8 m high at the 7 meter stand-off distance) of a target region onto a linear array of 60 horn antennas. Millimeter wave radiation collected by each of the horns is amplified by three low-noise amplifier circuits and the amplified signal passes through a delay line to a Rotman lens. Millimeter wave signals are collected by an array of 120 horns at the output of the Rotman lens and the signals collected by the 120 horns are monitored by an array of 120 diode detectors to produce a one dimensional image of the one dimensional section of the target region. The antenna is scanned horizontally to produce a two dimensional image of the target region. The two dimensional image is displayed on a monitor screen of a personal computer. Objects as small as 1 inch hidden under common types of clothing can be detected by the imager both indoors and outdoors.

In this preferred embodiment, the antenna is rotated horizontally in 60 steps over 2 sec acquisition time per frame. At each step a single image column containing 120 pixels is acquired. The resulting array of pixel columns will represent a 2D thermal image of a field of view that (at a distance of about 7 meters) is 1.8 meters in the vertical and 0.9 meters in the horizontal. At each beam orientation corresponding to an individual image pixel the system represents a highly sensitive radiometer that collects natural thermal radiation emitted and reflected from the one dimensional series of focal spots of the cylindrical antenna and converts each spot intensity into a pixel brightness. All of the independent spots having various horizontal and vertical orientations represent a two dimensional image of the target region with corresponding pixel brightness proportional to the radiometric temperature of these spots on objects and parts of objects in the field of view.

DETAILED DESCRIPTION OF PREFERRED EMBODIMENTS

First Preferred Embodiment

A first preferred embodiment of the present invention can be described by reference to FIG. 1. The imaging system is designed primarily to monitor personnel to search for hidden objects such as weapons, explosives or contraband. This millimeter wave imaging system operates in a frequency range of 75.5 to 93.5 GHz (wavelengths of 3.97 to 3.21 millimeters).

Antenna

The system utilizes a 0.6 meter×0.7 meter cylindrical Cassegrain antenna 2 that has a focal range of 6 to 8 meters that is 1.8 meter high at a range of 7 meters. The system is scanned horizontally to produce a 0.9 meter horizontal field of view at 7 meters so that its combined field of view at 7 meters is 1.8 meters vertical and 0.9 meters horizontal. The instantaneous field of view is about 3 centimeters wide and 1.8 meters high as shown at 4 in FIG. 1. The main reflector 6 of the Cassegrain antenna is a 600 mm×700 mm elliptical cylinder. Sub-reflector 8 is an 80 mm×700 mm hyperbolic cylinder. A horn array 10 of 60 horn antennas located near the center of the main reflector collects thermal power from the instantaneous field of view.

Amplifiers and Dicke Switches

Figure 1A:
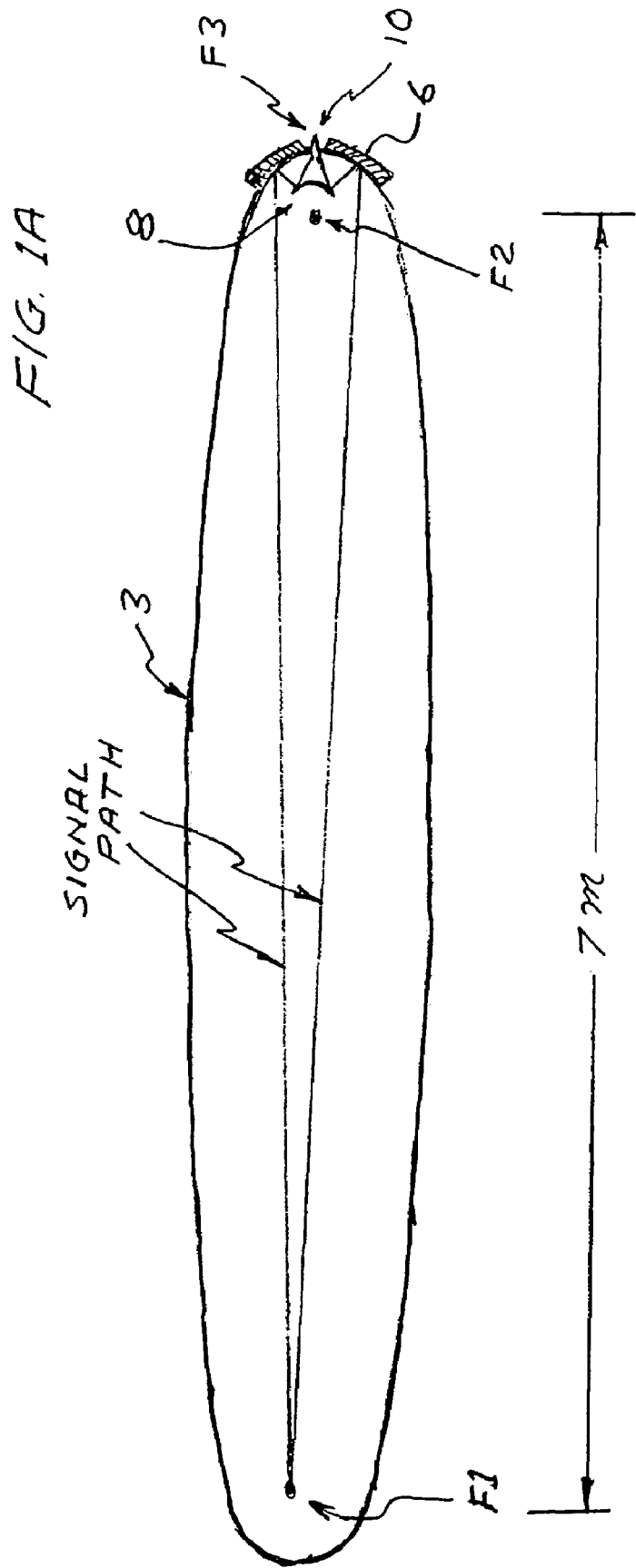
FIG. 1 is a drawing showing important features of a preferred embodiment of the present invention.
Figure 2:
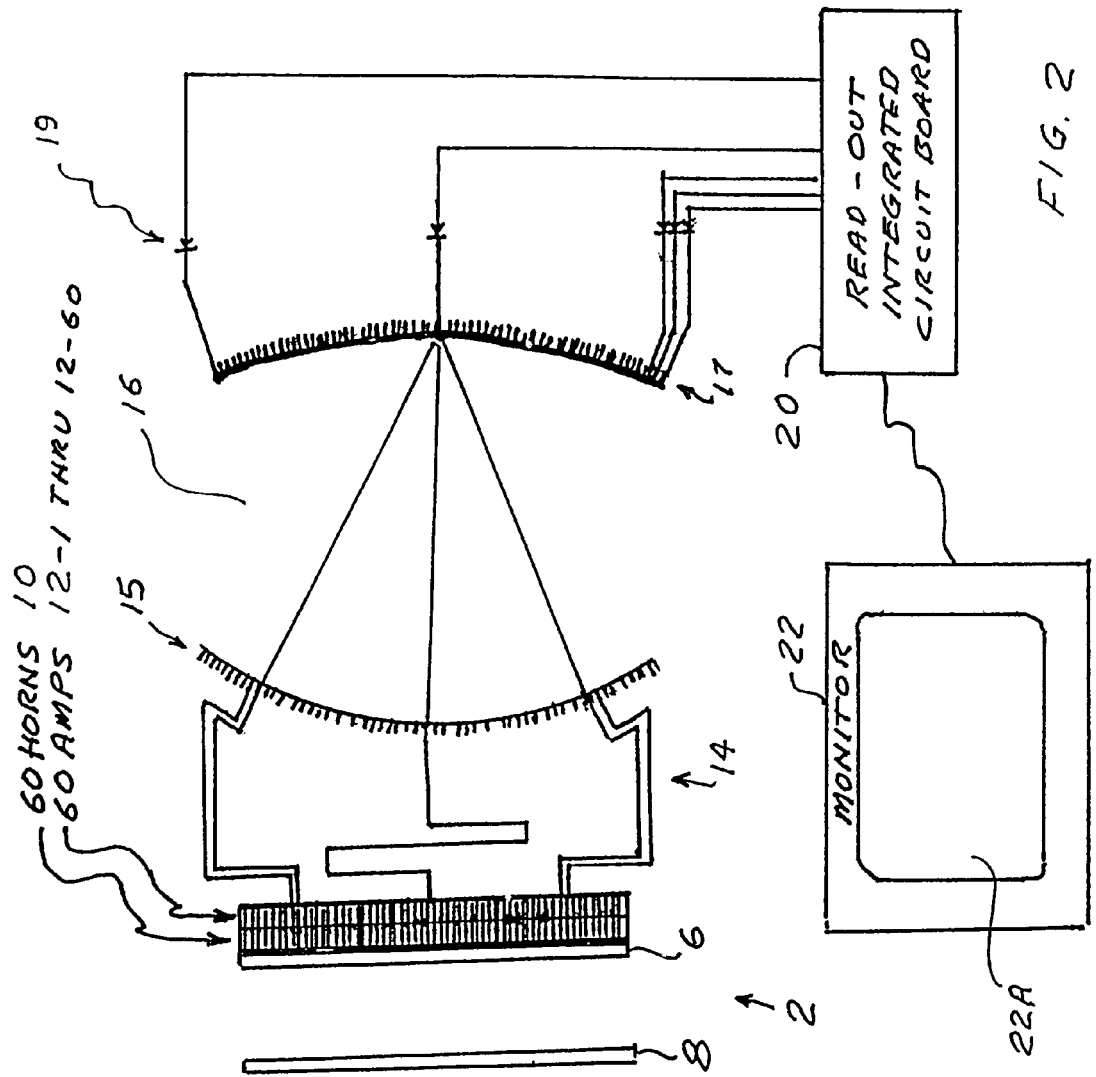
FIG. 2 shows some details of imaging forming components of the FIG. 1 preferred embodiment.
Figure 3:
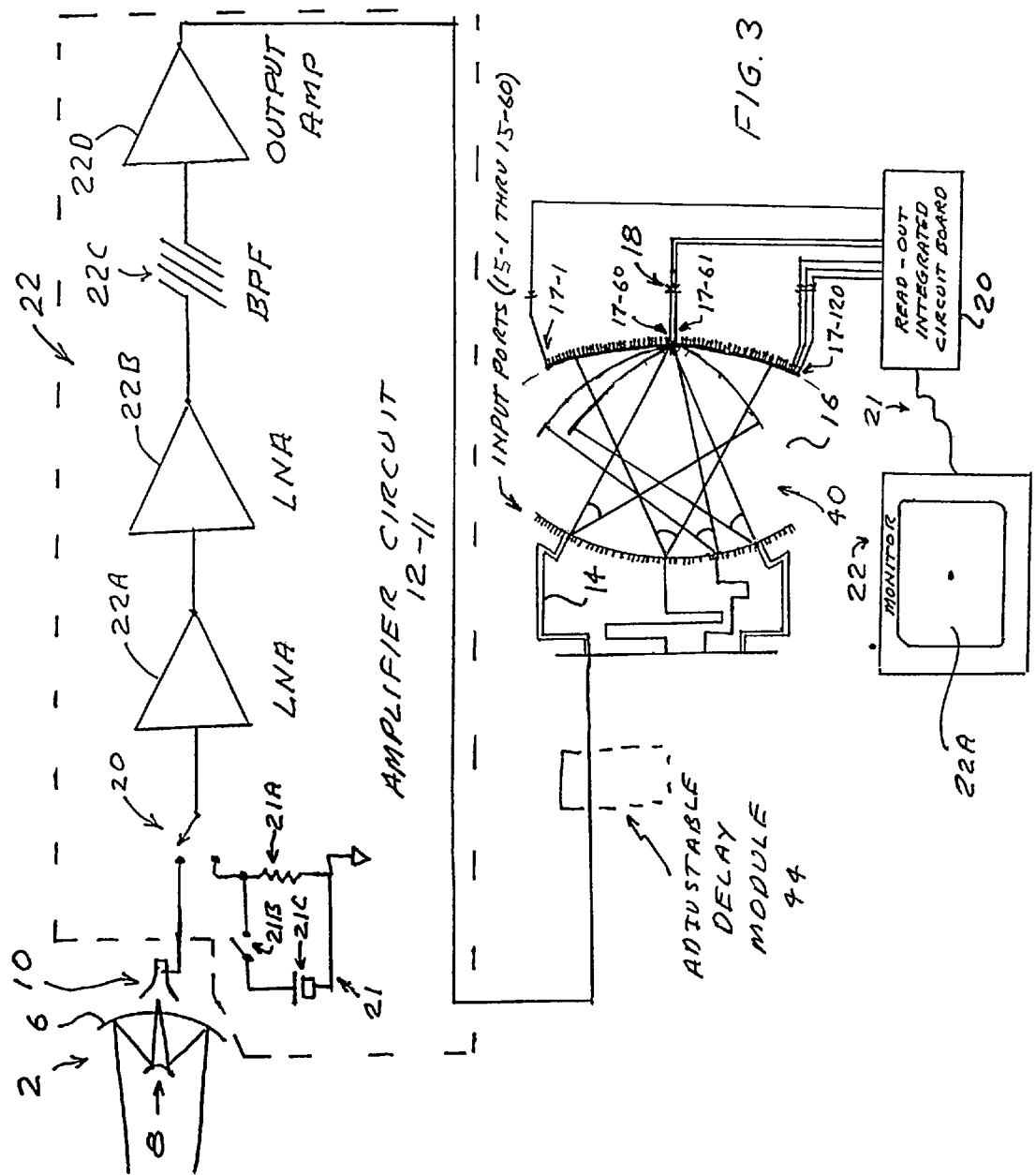
FIG. 3 is a drawing showing a calibration switch and low noise amplifier unit for one of 60 amplifier channels in the preferred embodiment.

Signals from each horn antenna are amplified by a 55 dB low noise, W-band, microwave monolithic integrated circuit (MMIC) amplifier unit in an array 12 as shown in FIG. 1 of 60 low noise amplifier circuits 12-1 through 12-60 as shown in FIG. 2. One of those circuits is shown as 21-11 in FIG. 3. Each amplifier circuit incorporates a MMIC PIN switch 20, called a Dicke switch, oscillating between a reference load and the antenna signal port. Dicke switches are conventionally used for compensating gain drift in radiometers. As shown in FIG. 3, the front-end Dicke switch 20 switches at a rate of 3.84 kHz between the antenna horn and the load termination ports. In this preferred embodiment the Dicke switches are also used for calibration of the imaging system. The load can be heated by approximately 40K by holding the switch in the load position and turning current on and off through the load resister 21A with switch 21B. System response to the known 40K temperature variation is then used for signal calibration and long term drift compensation. This allows the unit to perform a two-temperature calibration in real time, compensating for gain fluctuations in the amplifiers as well as temperature offsets. The switch itself is a MMIC PIN switch fabricated by M/A-Com with offices in Lowell, Mass. The switch has an insertion loss of 1.8 dB.

Figure 5:
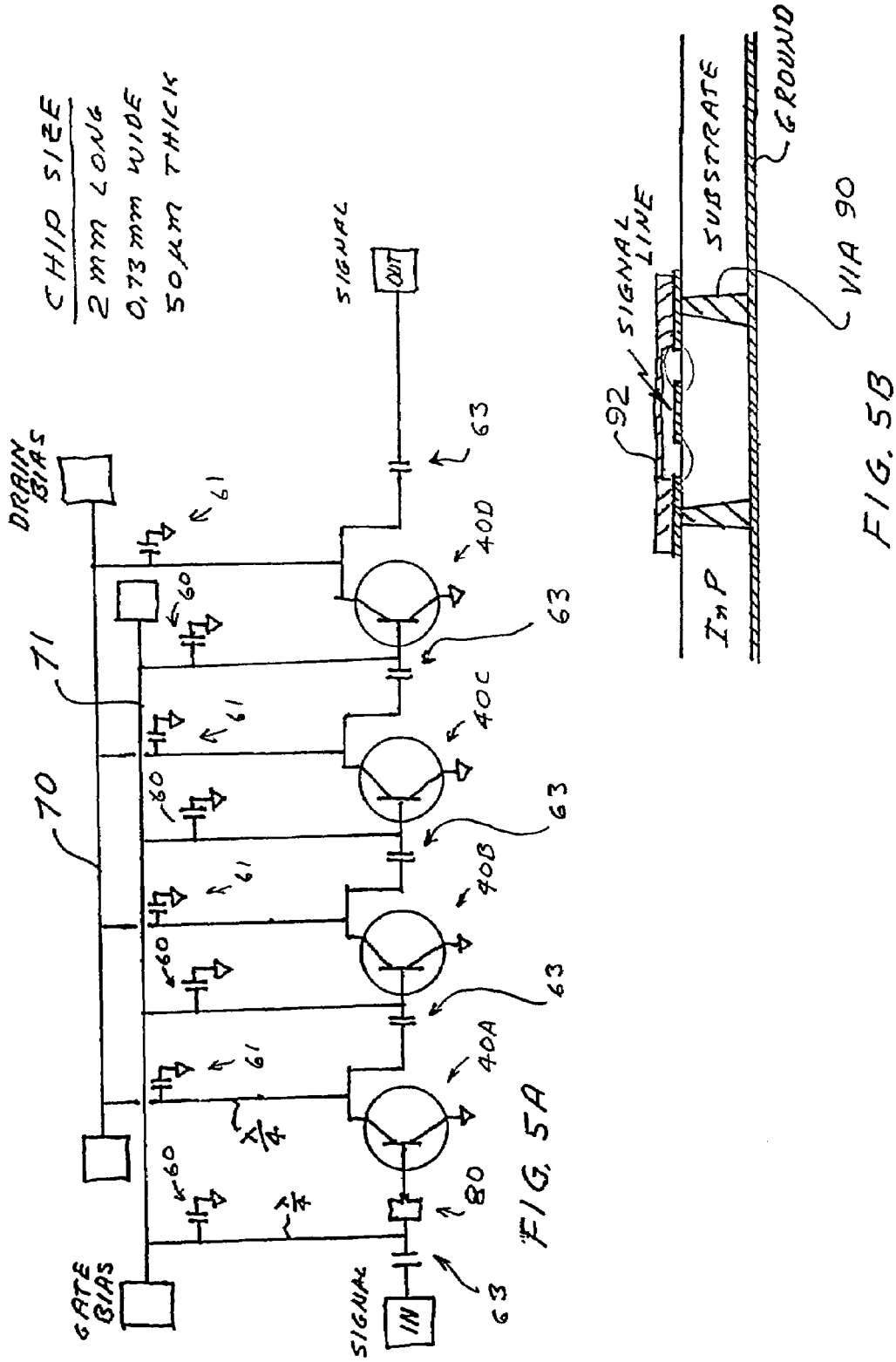
FIGS. 5A and 5B show features of an MMIC amplifier circuit on produced on a tiny chip.

The front-end switch is packaged with, and feeds directly into, a front-end amplifier unit 22. This front-end amplifier unit consists of two low noise MMIC amplifiers 22A and 22B, band pass filter 22C and low noise MMIC output amplifier 22D. The amplifiers are required to have a wide bandwidth but maintain a low noise figure, as they set the noise temperature for the entire system. They operate over an 18 GHz bandwidth, from 75.5 GHz to 95.5 GHz. The first two amplifiers in the chain 22A and 22B have a noise figure of approximately 4 dB over the 18 GHz band and a gain of about 19 dB. Band pass filter 22C separates these amplifiers from the third amplifier 22D that is of a slightly different design. The third amplifier 22D, the output amplifier, is tuned for a gain of about 22 dB and is capable of output powers of up to 1 mW before compressing. Once packaged, the entire gain stage has approximately 53 dB of gain and a noise output power of −11 dBm, with a noise figure averaging 7 dB. This includes losses from the filter and the transitions. Thus, each amplifier channel 22 provides 55 dB of gain, as well as an integrated matched load with a heater, and PIN switch for in-situ two-temperature flat field calibration. Each of the MMIC amplifiers shown in FIG. 3 (i.e., 20A, 20B and 20C) are actually four integrated circuit amplifiers 40A, 40B, 40C and 40D as shown in FIG. 5A and are preferably fabricated using a co-planer waveguide design on an indium phosphide substrate as a tiny 2 mm×0.73 mm×50 micron chip. The chip includes millimeter wave amplifiers 40A, B, C and D. The gate bias varies from 0 to negative 2 Volts and the drain bias is at a nominal 1.2 Volts. Quarter wave lines (centered at 84.5 GHz) and bypass capacitors 60 and 61 are provided to short circuit high frequencies in each amplifier circuit to isolate the amplifier circuits from each other and to prevent unwanted feedback to the other circuits. Capacitors 63 are DC blocking capacitors. An impedance matching transformer 80 is included to match the impedance of the input circuit to the amplifier circuit. FIG. 5B shows generally how the signal lines are prepared in an indium phosphate substrate. This technique is known as a grounded co-planar waveguide. In it the signal line is surrounded by ground structures utilizing bridge structure 92 and vias 90 along with the ground below the substrate.

Focusing and Beam Forming

As shown in FIGS. 1 and 3, amplified signals from the low noise amplifiers are processed by a broad band millimeter wave beam former lens system 16 to produce a 120 pixel linear image 22A on monitor 22 of the instantaneous field of view of the imaging system.

Figure 4:
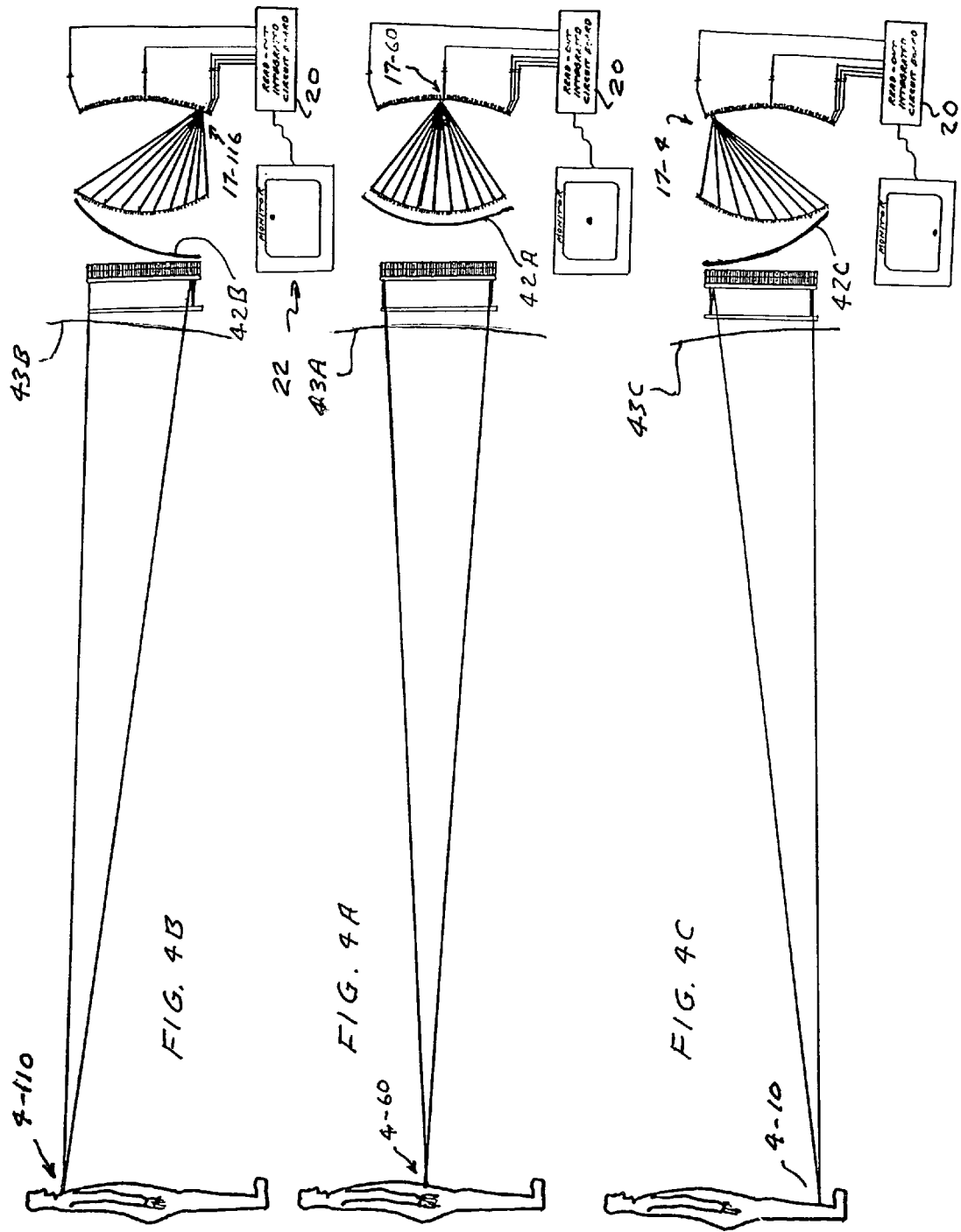
FIGS. 4A, 4B and 4C describe the preferred technique of producing an image of an instantaneous vertical field of view of a target region.

The amplified antenna power is fed into a beam-former system 16. One channel of the beam former system is described in FIG. 3 for producing a vertical image of the antenna instantaneous field of view. Delay lines 14 transmit the 60 amplified antenna signals into 60 signal ports of beam-former 16. Beginning at port 15-1 at the left side of beam-former 16, the signal to each port is delayed by a time interval chosen such that millimeter radiation in the frequency range centered at 84.5 GHz (wavelength of 3.55 mm) from the central point of the vertical focus arrives at each of the 60 ports (15-1 through 15-60) of beam-former at as close as feasible to the exact same time. The arrows and arcs 40 shown in the FIG. 3 drawing represents the path within beam former 16 of millimeter radiation that emitted from a location at the midpoint of instantaneous field of view 4 of the target region as shown in FIG. 1. As explained above delay lines 14 have been designed so that millimeter wave radiation in the range of about 84.5 GHz leaving this midpoint region (i.e., the location of the gun in FIG. 1) in phase arrives at input ports 15-1 through 15-60 in phase. Input ports 15-1 through 15-60 are located on a circular arc with the center of the circle corresponding to midpoint of the set of 120 output ports 17-1 through 17-120. Therefore, in phase millimeter wave radiation leaving the region of the gun 5 in FIG. 1 will arrive at the general location of output ports 17-60 and 17-61 in phase and will add constructively. Millimeter wave radiation in the range of about 84.5 GHz leaving region 4 at any location other than the location near the gun 5 will arrive at output ports 17-60 and 17-61 out of phase and will add destructively. A wave front representing millimeter wave radiation in the range of about 84.5 GHz leaving the FIG. 1 gun region in phase is indicated at 42A in FIG. 4A. Similarly, a wave front representing millimeter wave radiation in the range of about 84.5 GHz leaving a location near the top of region 4 in of the FIG. 1 target region in phase is indicated at 42B in FIG. 4B, and a wave front representing millimeter wave radiation in the range of about 84.5 GHz leaving a location near the bottom of the FIG. 1 target region in phase is indicated at 42C in FIG. 4C. The radiation from the top of the target as shown in FIG. 4B interferes constructively at output ports near 17-116 and radiation from the bottom of the target as shown in FIG. 4C interferes constructively at output ports near 17-4. Millimeter wave energy at each at each output port 17-1 through 120 is collected by horn 17-1 through 120 at he back of lens 16 and the signal is picked up by diode detector circuit 18 that integrates the millimeter wave energy to produce a simi-continuous signal representing the millimeter wave energy emitted and scattered from a corresponding vertical position in the target region at the instantaneous field of view of antenna 2. The collector horns (and the detector circuits) are effectively spaced at one half of the spatial resolution limit of the antenna and the beam former. Each of the 120 channels represent thermal signal arriving at antenna from a specific elevation. Therefore, at each output of the beam former system 16 the diode circuits produce a DC signal proportional to the thermal power arriving from a corresponding portion of the instantaneous field of view. Losses in the delay line, the beam-forming lens, and input transition drop the power level at each lens output to about −36 dBm.

Each of the 120 sensitive detector diodes in detector array 18 as shown in FIGS. 1 and 3 integrates the power in each channel to provide a voltage signal corresponding to the intensity of the millimeter wave light collected by the antenna element of the 60 vertical locations in horn array 10. The voltage signal from each of these diode signals is then read out by multiplexing readout integrated circuit chips on readout integrated circuit board 20 as shown in FIGS. 1 and 3. These signals are then amplified and digitized and then processed and transmitted by a link 21 (that may be either cable or wireless) to a personal computer where the instantaneous vertical image is displayed as an image on the screen 22A of a personal computer 22.

Rotation Stage

The antenna and all signal processing electronics (items 2 through 20) is packaged and mounted on a rotation stage as indicated in FIG. 1. The stage rotates horizontally through an angle of 8 degrees under PC control in order to scan horizontally a region 0.9 meter wide (at the 7 meter range) to generate a two-dimensional image of any object in the target region of the system. The image may be continuously updated by computer 22 on computer screen 22A. Alternatively, the images may be still images refreshed after each scan.

Locating Lens Output Port

As indicated above input ports to beam former 16 are located on a circular arc with the center of the arc being positioned at the center of the array of output ports. This precisely locates only one or two of the output ports. The remainder of the output ports 17-1 through 59 and 62 through 120 must be determined based on the optical parameters of the total system. Applicants have concluded that it is not possible to provide perfect constructive interference for every location on the output of the lens for every point in the instantaneous vertical field of view 4-1 through 4-116. The exact location of output ports 17-1 through 17-120 preferably is computed such that the waves arriving from a particular spot in the vertical field of view 4-1 to 4-116 combine constructively with the maximum practicle efficiency.

The beam-former system 16 is implemented in a low loss dielectric (such as polypropylene) circuit board with smooth copper cladding. The delay lines 14 are created at very low cost with a lithographic etching that creates the circuit pattern, which is then sandwiched between two ground planes in a heated press. In preferred embodiments, the smoothness of the copper making up the inside surface of the delay lines is extremely important. Applicants have discovered that they could reduce the losses in these lines from 1.2 dB per inch to about 0.5 dB per inch by requiring that the copper surface roughness not exceed 300 nanometers. Prior art microwave surface roughness specifications were 1400 to 2900 nanometers. As explained above, the signals from these 60 taps are launched into beam-forming lens 16, which steers the beam into one of 120 output ports 17 corresponding to a vertical location at the instantaneous field of view of antenna 2.

Beam Former Fabrication

The beam former board fabrication starts with two 10 mil thick flat polypropylene panels laminated with smooth ½ oz copper on both sides. In the preferred embodiment the initial size of the panels is approximately 0.6×0.6 meters. The panel that will make the top portion of the beam former then has one side copper layer etched away. That leaves one surface of the panel's polypropylene completely exposed. The second panel, which is used as a bottom portion of the beam former board, is subjected to a conventional lithographic process where the image of the circuit is projected onto a photosynthesized copper layer followed by etching away unwanted copper material. As a results, only the copper that makes delay lines, Rotman lens and other circuit elements of the beam former remain attached to the surface of the polypropylene. In both top and bottom panels the opposite copper sides are protected against etching and form continuous ground plates in the finished board. Etched boards trimmed, drilled and otherwise mechanically processed to the desired dimensions and shape. Then they are thoroughly cleaned using techniques that do not roughen the copper surfaces but remove any residual chemicals which may interfere with the fusion process. The top and bottom parts are carefully aligned relative to each other and placed into a thermal press such that the ground plates stay outside and the copper-free surface of the top panel faces the surface of the bottom panel that contains beam former circuit. The two parts a heated to a temperature near melting point of the polypropylene material and pressed together. The heating and compression causes fusion of the exposed polypropylene areas in both boards and also makes polypropylene to adhere to the copper. The resulting board undergoes final trimming.

System Specification

The primary specifications for the system most of which are discussed above can be summarized as follows:

| | |
|---|---|
| Operation frequency band: | 75.5-93.5 GHz |
| Antenna size: | 0.6 meter × 0.7 meter |
| Range: | 7 ± 1 meter |
| Sensitivity: | 0.3-0.5 Kelvin |
| Image frame size, 2x oversampled: | 120 (vertical) × 60 (horizontal) pixels |
| Spatial resolution: | 30 mm |
| FOV at 7 meters: | 1.8 meters (vertical) × 0.9 meter (horizontal) |
| Acquisition time per frame: | 2 seconds |
| Weight: | ~30 kg |

Packaging

The imaging system is packaged for easy transportation and deployment. A protective shield (radome) covers sensitive elements of the system to protect it against weather and mechanical damage. Base of the system that includes antenna, electronics and rotation stage will be tilt adjustable to ensure optimum orientation of the system during deployment and imaging. A visible camera aligned with the image field of view would simplify pointing the imager at the object to be scanned. The system can be operated from a distance of a few hundred meters or more using cable or wireless connection to the system computer.

Operation

With the system deployed and activated a human subject to be screened places himself within the antenna field of view near the focus of the antenna approximately 7 meters away from the main reflector. With the sub-reflector positioned in the second focus of the main reflector thermal signal from the subject will be directed into the array of 60 horn antennas, amplified and processed. The antenna is mechanically scanned horizontally across the field of view as describe above to acquire full two dimensional image of the subject. The subject may be required to turn himself and raise his arms and spread his legs so that images of various aspects of the subject can be acquired in various body positions to reveal objects that could be hidden in different locations on his body.

BACKGROUND AND ILLUMINATION

Background

When a person is not in the antenna field of view, the antenna has nothing within its focal area and instead receive signal from a broad area beyond the focal region. This area can be coated with millimeter absorptive foam at ambient temperature. The foam acts as a blackbody at millimeter wave frequencies, emitting a fixed, broadband signal to the antennas. If the foam temperature is less than the temperature of a human body, the foam provides a good contrast to a person entering the field of view. This improves the clarity and sharpness of the generated images. Also, in preferred embodiments contour contrast can be added to the images of the persons being screened by providing a cold surface above and around the focal region would be a source of low temperature thermal radiation. Therefore, millimeter radiation in the band detected by the antenna elements that is reflected off the person after being emitted from the cold source will be very small compared to reflected radiation from other surrounding warmer sources. As a result the scanner will see substantial contrasts on the persons scanned depending on the angular orientation of various portions of his body, his clothing and potential contraband.

Illumination

In some situations a subject or regions of interest on the subject could be illuminated with harmless millimeter wave radiation that would be transmitted through his clothing mostly absorbed by his body but would be mostly reflected by objects such as guns, knives and other weapons.

Illumination panels may be used to provide this harmless millimeter wave radiation. The panels serve to provide an illumination source that gives a high enough temperature contrast so that the image will have a large enough signal to noise ratio in a short integration time. The panels can be either warmer or colder than the ambient, although for the same temperature difference it is easier to build a hot panel than a cold one. A well constructed hot panel will deliver only the filtered millimeter wave radiation that represents the illumination temperature, but not other thermal radiations. This way the object being imaged will not feel the "temperature".

A preferred hot panel consists of insulating layers that keep most of the thermal (non-millimeter wave) energy from leaking out, thus minimizes the heating required. One of the insulating layers (the one facing the target) needs to be transparent to millimeter wave, thus a millimeter wave illumination source. A layer of uniform heating material attached to the millimeter wave blackbody layer and a temperature monitoring and feedback system so that the blackbody layer is kept at a constant temperature thus defines the illumination temperature.

Applicants have performed a small scale demonstration of the hot illumination panel concept. The illumination panel is set at 95° C., some 70° K above room temperature. A metal object is clearly detectable with just one frame from a millimeter wave imager. Placement of the panel is very important for object detection. The design also needs to consider the object's possible orientation angles to ensure concealed objects are detected.

Illumination Panel Construction

Figure 7:
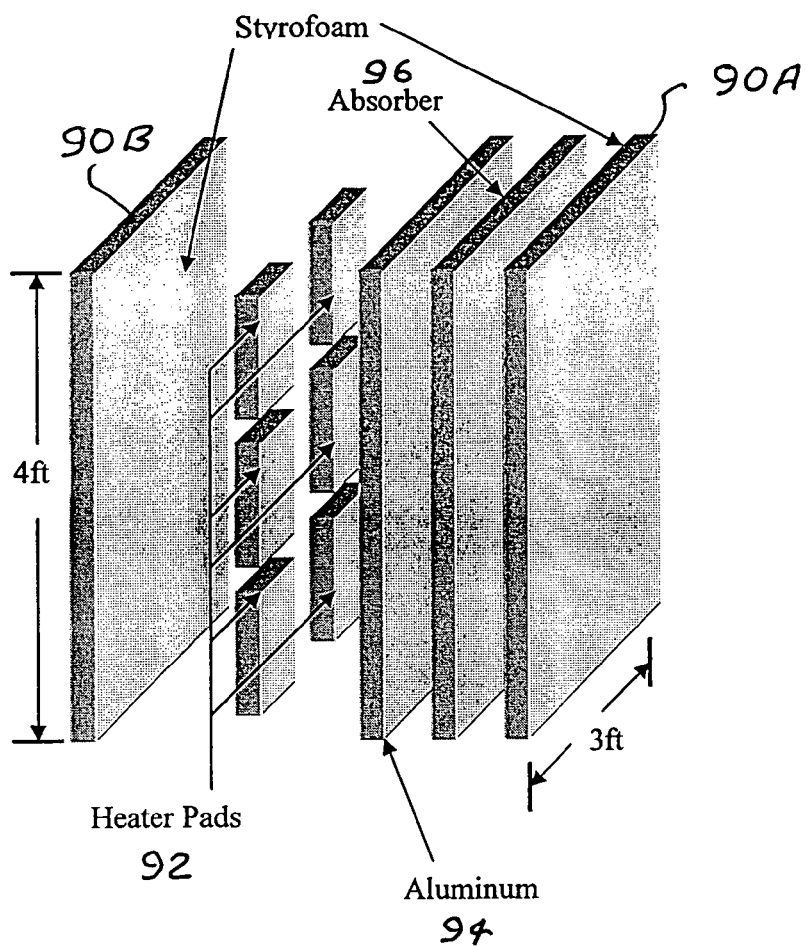
FIG. 7 shows a millimeter wave illumination panel useful for improving contrast.

Following is an example of an illumination panel construction. Size and shape may vary depending on application and environment. A drawing of a preferred panel is shown in FIG. 7. The panel is 3 feet by 4 feet. It includes front panel 90A (that faces the object to be illuminated) and back panel 90b constructed of 1 inch thick dense Styrofoam (available from Dow Chemical—Duramate) and six heater pads 92 available from Thermion TSI4OU0136) and an $\frac{1}{16}$" thick aluminum heat spreader sheet 94. The panel includes a ½ inch thick millimeter wave absorber layer 96. The layer may be carbon filled foam or ferromagnetic filled rubber. A preferred absorber is Eccosorb® available from Emerson & Cuming with offices in Randolph, Mass. Four thermocouples are spread around the absorber surface to monitor its surface temperature. A wooden retaining frame may be provided to hold layers in place. The total thickness of the panel is about 3 inches.

A similar plan can also be used for making a cold panel. A cryogen of an air conditioning unit can be used to cool the absorber layer. The panel can be placed to provide a low-temperature background to the subjects being imaged. The panel could also be used for cold illumination. The reader should understand that when Applicants use the phrase cold illumination they really mean that the panel is used to assure that the subject is being illuminated with less millimeter wave radiation than would otherwise be the case. The panel effectively absorbs thermal radiation (from much warmer walls and other objects) that might otherwise reflect from reflecting surfaces (such as metal objects) on the subject. Therefore, a surface such as the blade of a metal knife appears colder (than the subjects body) when exposed to the cold panel than under illumination from warmer walls. On the other hand under millimeter wave illumination from a very hot panel, the metal object would appear much warmer than the subject's body. In some situation it may be desirable to design a system with alternate hot and cold illumination. This could be done, for example, by placing hot and cold panels on a rotating platform.

Other Techniques for Obtaining Horizontal Scans

Figure 6:
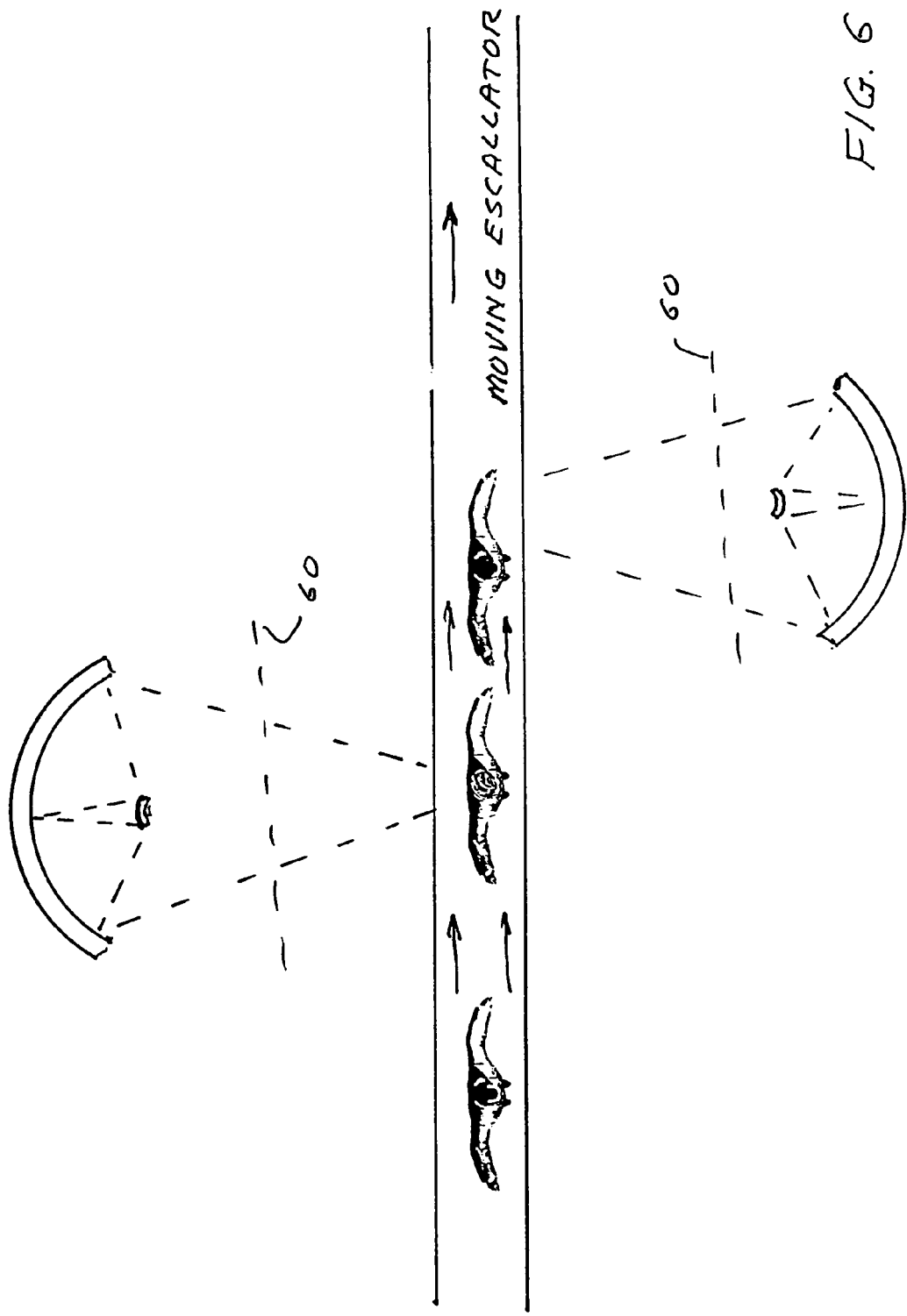
FIG. 6 shows an embodiment where two units are used to scan subjects moving on a horizontal escalator.

In addition to the rotating antenna, there are many other techniques available for obtaining horizontal scans. For example, subjects to be scanned could be required to stand on a horizontal escalator that carries the subject across the instantaneous field of view of the antenna. In this case, at least two systems preferably are used as shown in FIG. 6 (one on each side of the escalator) to acquire at least a front and a back views of each subject. In some cases a millimeter wave transparent barrier 60 can be placed between the subject and the antennas so that subjects are not aware of being monitored assure the proper positioning of the persons relative to the antenna elements.

In some applications the system could be installed on a vehicle that passes horizontally by subjects while scanning them. Images of the subjects are obtained by correlating the image creation with the relative speeds of the vehicle and the subjects. The sub-reflector of the Cassegrain antenna can also be moved to provide narrow angle horizontal beam scans.

Changing the Focus

In the preferred embodiment described in detail, the system focus is at 7 meters form the antenna. The system can be designed for any fixed focus by adjusting the lengths of delay lines 14. These delay lines are preferably produced lithographically using printed circuit board technology and at high volume production the boards can be made at very low cost. Therefore, several sets of boards representing different focuses can be provided with each system. The horizontal focus can be adjusted by varying the shape of the main reflector and in the position of sub-reflector 8 relative to main reflector 6.

While the present invention has been described above in terms of particular embodiments, persons skilled in the art will recognize that many other changes may be made. For example, infrared or visible cameras synchronized with the millimeter wave screener may be adapted to provide correlated identity and reference information. Increasing the size of the antenna could also improve the resolution. Therefore, the scope of the present invention should be determined by the appended claims and their legal equivalents.

We claim:

1. A broad-band millimeter wave imaging system, useful for producing images of metal and non-metal objects such as guns, knives and explosives hidden under clothing, comprising:

A) a linear array of radiation collectors,
   B) a cylindrical antenna for focusing millimeter wave radiation from a substantially one dimensional section of a target region onto said a linear array of radiation collectors,
   C) an array of millimeter wave amplifiers for amplifying millimeter wave radiation collected at each radiation collector to produce a set of amplified millimeter wave signals.
   D) a millimeter wave beam forming lens defining an input side and an output side for focusing at its output side amplified millimeter wave radiation received at its input side,
   E) a plurality of input ports located along the input side of said beam forming lens.
   F) an array of focusing delay lines in communication with said array of amplifiers and the plurality of input ports along the input side of said beam forming lens for delaying each amplified millimeter wave signal by a time interval such that millimeter wave radiation from a point near the center of said target region arrives at each of the input ports at about the same time,
   G) an array of detectors located at said output side of said millimeter wave lens for collecting millimeter waves focused by said lens to produce a one-dimensional image of a portion of the target region,
   H) a scanning means for scanning the antenna to produce a two-dimensional image of the target region and
   I) a monitor for displaying said two-dimensional image of said target region.

* * * * *